Jan. 15, 1935.  O. ZANCAN  1,988,347

FOUR-WHEEL BRAKING SYSTEM

Filed July 30, 1932  2 Sheets-Sheet 1

INVENTOR
Ottavio Zancan

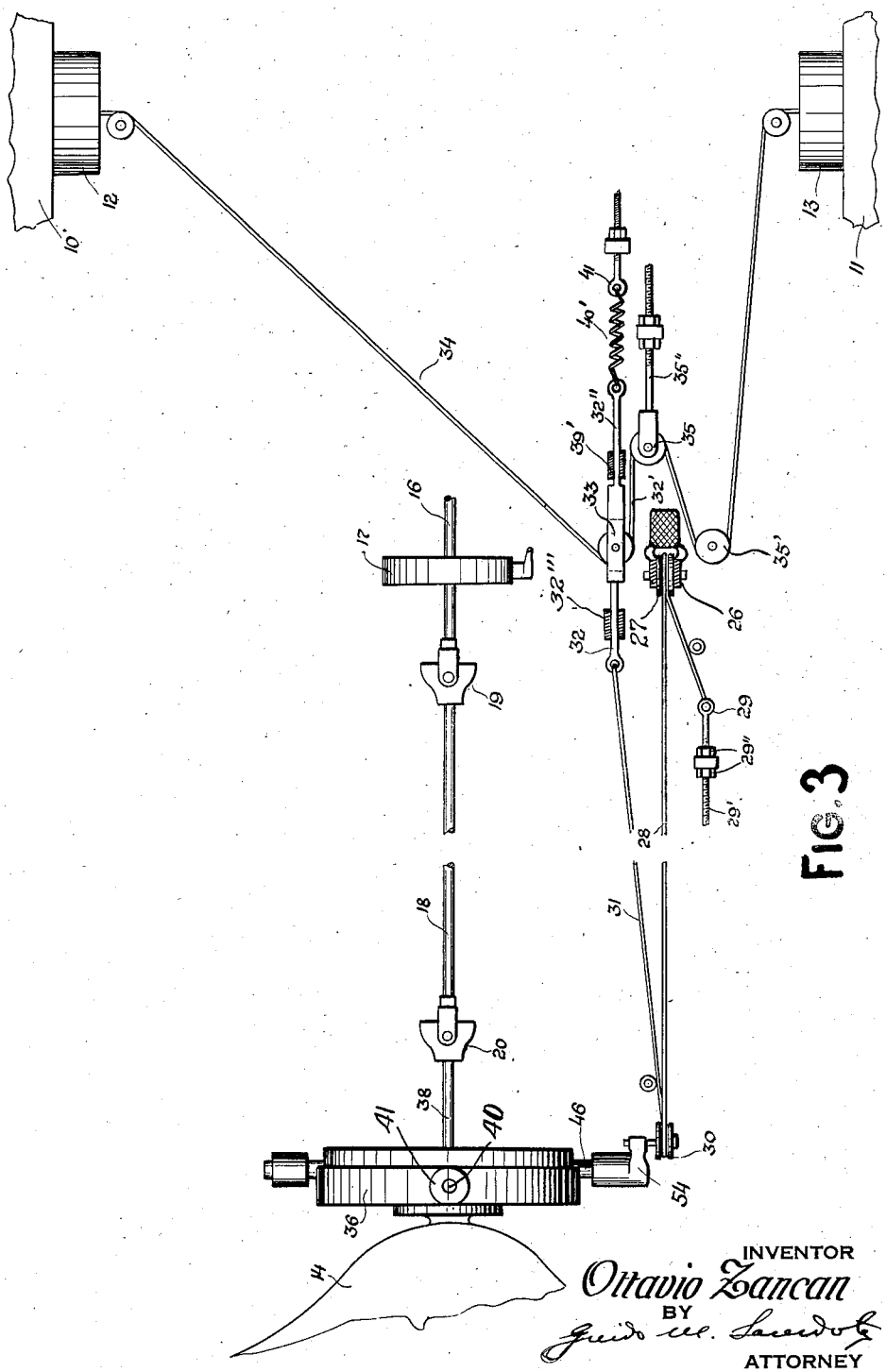

Patented Jan. 15, 1935

1,988,347

UNITED STATES PATENT OFFICE 1,988,347

FOUR-WHEEL BRAKING SYSTEM

Ottavio Zancan, New York, N. Y.

Application July 30, 1932, Serial No. 626,921

14 Claims. (Cl. 188—10)

This invention relates to motor cars and more particularly refers to improvements in motor car braking systems.

In motor car braking systems it is desirable to provide for the equalization of the braking action exerted upon wheels mounted at the opposite ends of the same axle, and it is also desirable to provide cooperation between and unity of control for the front and rear brakes when a four-wheel braking system is employed.

In another patent application entitled Motor car axles and brakes, Serial No. 446,955, copending herewith, I have described and claimed a braking arrangement which may be applied to the rear axle of a front axle drive motor car, or to the front axle of a rear axle drive motor car, the same being also applicable to the rear axle of motor trucks, in which the rear wheels are rotatably mounted upon the axle and are driven by means of chains.

The main characteristic of said braking arrangement is that the braking devices provided for each of the two wheels at the opposite ends of the same axle are interconnected by means of a single actuating element, preferably of a flexible character, capable of simultaneously transmitting the braking pull to both brakes.

In still another patent application entitled Motor car braking systems, filed August 28, 1931, Serial No. 559,831, I have described a front and rear braking system, in which a single controlling element is made to operate both the front and rear brakes, so that a four-wheel braking system results.

In said application I have shown and described a special type of brake adapted to control the operation of the propeller shaft so as to cause a self-equalizing action to take place between the two wheel-carrying shafts outwardly extending from the differential, mounted within the rear axle.

The use of such a type of a rear brake simplifies the problem of cooperation and equalization between and unity of control for the front and rear brakes. In order to provide an arrangement whereby the rear brake is actuated somewhat in advance of the front brakes, in said application I have described a sliding cam control of the rear brake which permits the brake pedal to move in the braking direction, after the rear brake has been actuated to a certain extent.

In practice I have found that such a sliding cam control is not always entirely satisfactory because of its complications of design and adjustment and, therefore, I have sought to improve upon the arrangement described in said application.

The primary object of this invention is accordingly to provide a novel and improved four-wheel braking system for motor cars which is relatively simple and positive in its action, and which can be easily adjusted in order to take up the wear of the various brakes.

Another object is to provide in a motor car a four-wheel braking system of a novel and improved design, whereby the braking action will be exerted first at the rear and will then be extended to the front of the car.

Further objects and advantages of the present invention will more fully appear as the description proceeds and will be set forth and claimed in the appended claims.

My invention is illustrated by way of example in the accompanying drawings in which:

Fig. 3 is a fragmentary plan view of a motor car braking system embodying my invention.

Figure 1:
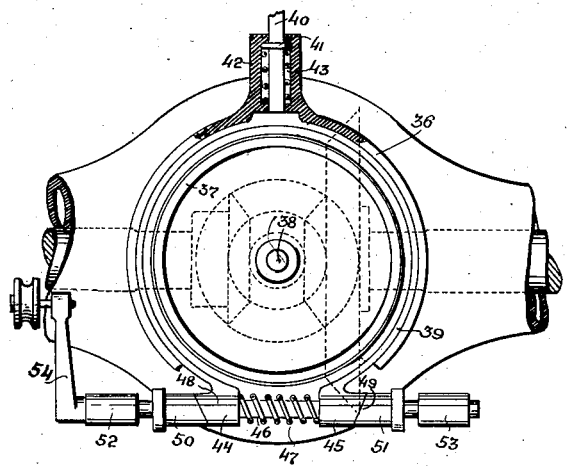
Fig. 1 is a front view, partly sectioned, of a braking mechanism adapted for use in connection with my invention.
Figure 2:
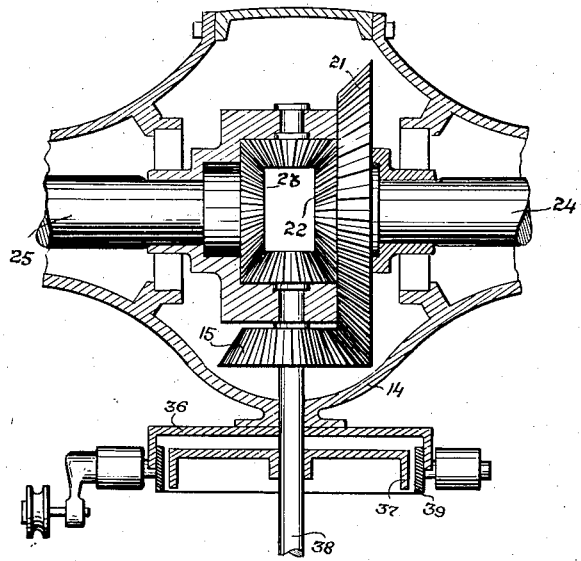
Fig. 2 is a plan sectional view thereof.

Referring to the drawings 10, 11 designate the two front wheels of a motor car, 12, 13 the brakes therefor and 14 designates the housing for the differential gearing. The propeller shaft comprises a front part 16, rear part 38 and intermediate part 18, connected to said parts 16, 38, by two universal joints 19, 20, respectively.

The rear end of rear part 38 of the propeller shaft carries the differential pinion 15, which drives the differential gear 21 in the usual manner.

The rear brake comprises a stationary cup member 36, fixed upon the differential housing 14, a drum 37 mounted upon shaft 38 of the differential pinion 15 and a flexible band 39 interposed between cup member 36 and drum 37. The upper part of said band is provided with a pin 40, having a shoulder 41, inserted within a housing 42 integral with cup member 36, and spring 43 bearing against shoulder 41, normally retains band 39 away from drum 37, but permitting said band being drawn against said drum.

Band 39 is split at its lower end and is formed integral with two co-axial lugs 44, 45, slidably mounted upon a shaft 46 and normally held apart by a spring 47. Said lugs have inclined outer surfaces 48, 49, against which bear similarly inclined outer surfaces of bushings 50, 51, fixed upon shaft 46, said shaft being rotatably mounted on supports 52, 53.

By virtue of this construction it is obvious that when shaft 46 is rotated the inclined surfaces of bushings 50, 51, will exert a cam action against the adjoining inclined surfaces of lugs 44, 45, and will force the same inwardly so as to contract band 39 and to force it against the outer surface of drum 37.

It will be observed that the ensuing braking action upon the propeller shaft will be transmitted by pinion 15 to gear 21 and will become equalized between the differential gears 22, 23, mounted upon rear wheel shafts 24, 25, respectively, so that the braking mechanism shown and described does away with the necessity of using two brakes, one for each wheel, in connection with the rear axle.

However, although the mechanism just described controls the operation of the propeller shaft, said braking mechanism is provided in addition to the usual emergency brake 17, which also controls the propeller shaft.

Brake shaft 46 is operated by a lever 54, which may be actuated by a pedal or hand lever, but which is preferably connected to a flexible element adapted to control both the front and rear brakes.

As explained in my copending application entitled Motor car braking systems, when both front and rear wheel brakes are employed it is preferable to so arrange their controls that the rear brake, or brakes, are actuated somewhat in advance of the front brakes in order to create a drag, preventing the overturning of the car, which is likely to take place when the braking action is exerted at the front and rear simultaneously.

In Fig. 3 I illustrate the preferred way of combining the front and rear brakes in a single braking system, capable of producing a self-equalizing action between the rear wheels and between the front wheels, forming the subject of this invention.

In the same 26 designates the actuating pedal, which is provided with a pulley 27 around which is inserted a flexible element 28, having one of its ends fastened to a fixed point 29. From pulley 27 said flexible element extends to the rear of and around a pulley 30, carried by lever 54 and then extends frontwardly at 31, its other end being fastened to a rod 32 sliding within bearing 32'''. Said sliding rod carries a pulley 33 about which is wound a flexible element 34, connecting brakes 12 and 13, said flexible element being furthermore wound about and guided by idler pulleys 35, 35'.

It will be seen that by virtue of this arrangement, when pedal 26 is moved frontwardly flexible element 28 will exert a pull on lever 54 and upon sliding rod 32. Sliding rod 32 in its turn will exert a pull on flexible element 34 and will cause said flexible element to operate brakes 12, 13, equalizing their braking action.

It is obvious that the springs in the various brakes can be so regulated that when pedal 26 is moved frontwardly, lever 54 will give first, operating the rear brake and then, said lever and pulley carried thereby having become stationary, continued movement of pedal 26 in the same direction will cause sliding rod 32 and pulley 33 carried thereby, to exert a tension on flexible element 34, actuating the front brakes.

It will be seen that in this manner the problem of exerting a braking action both at the front and the rear by means of a single controlling member is greatly simplified, because so far as the rear braking action is concerned, it is only necessary to provide for the operation of a single brake lever 54.

The brakes used may be per se adjustable to take up the wear on their frictional surfaces, but in practice I prefer to provide readily accessible means independent of the brakes for adjusting the various elements of the system when needed.

I, therefore, show the fixed point 29 to which one end of flexible element 28 is attached, as being provided by the front end of a bolt 29', which is longitudinally adjustable to take up the slack in flexible element 28, by means of checknuts 29''.

I also show the part of rod 32 carrying pulley 33 extended beyond said pulley at 32' and provided with a stem portion 32'' slidable within a bearing 39'. The outer end of stem portion 32'' is attached to a spring 40', the tension of which may be adjusted by means of attaching bolt 41.

When no braking action is exerted spring 40 is not under tension, but as soon as a pull is exerted on flexible element 28, said spring will supplement the action of brakes 12, 13 in opposing the displacement of pulley 33. By means of this arrangement it is, therefore, possible to regulate the resistance offered by the displacement of rod 32, and so to carefully time the operation of the front and rear brakes.

Any slack in flexible element 34 can furthermore be taken up by means of pulley 35 at the end of an adjusting bolt 35'', so that any condition arising from wear of the brake linings can be easily corrected.

As to this it will be observed that the adjustment of pulley 35 can also be utilized for taking up any slack in flexible element 31, and conversely it will be observed that by adjusting bolt 29' flexible element 31 may be caused to displace rearwardly pulley 33 so as to take up any slack in flexible element 34.

In practice, for convenience, I prefer to use both the adjusting means 29', 35, but I do not wish to be limited in this respect to the arrangement shown.

It will be observed that the fact that the flexible element 28 is caused to ride over pulley 27 of lever 26, does not exclude the possibility of said flexible element being attached directly to said lever, the only difference being that in the arrangement shown a given displacement of lever 26 will cause a smaller longitudinal displacement of flexible element 28 than if said element were attached directly to said lever.

The drawings, therefore, will be understood as being intended for illustrative purposes only and not in a limiting sense. I accordingly reserve the right to carry my invention into practice in all those ways and manners which may enter, fairly, into the scope of the appended claims.

I claim:

1. In a motor car the combination, with a front axle, two wheels rotatably mounted thereon, and a brake for each wheel, of a flexible element connected to and controlling said two brakes; a rear braking mechanism, a brake actuating lever therefor, a brake controlling lever, and a flexible connection controlled by said controlling lever, extending between said controlling and actuating lever, and between said actuating lever and said flexible element, adapted to operate said actuating lever and said flexible element.

2. In a motor car, a front axle, two wheels rotatably mounted thereon, a brake for each wheel, a shiftable member carrying a pulley, a flexible element riding over said pulley, connected to and actuating said two brakes, a rear braking mechanism, a brake actuating lever therefor, a pulley carried by said actuating lever, a brake controlling lever, and a flexible connection controlled by said controlling lever, extending between said controlling lever and said actuating lever pulley, and between said pulley and said shiftable member, whereby a pull exerted by said controlling lever upon said connection will be transmitted by both said actuating lever and said flexible element.

3. In a motor car the combination, with a front axle, two wheels rotatably mounted thereon, and a brake for each wheel, of a flexible element connected to and controlling said two brakes, a rear braking mechanism, a brake actuating lever therefor, a brake controlling lever, a flexible connection controlled by said controlling lever, extending between said controlling and actuating lever, and between said actuating lever and said flexible element, adapted to operate said actuating lever and said flexible element, and means for adjusting the tension of at least one of said flexible members.

4. In a motor car the combination, with a front axle, two wheels rotatably mounted thereon, and a brake for each wheel, of a flexible element connected to and controlling said two brakes, a rear braking mechanism, a brake actuating lever therefor, a brake controlling lever, a flexible connection controlled by said controlling lever, extending between said controlling and actuating lever, and between said actuating lever and said flexible element, adapted to operate said actuating lever and said flexible element, and means for adjusting the tension of said flexible connection.

5. In a motor car the combination, with a front axle, two wheels rotatably mounted thereon, and a brake for each wheel, of a flexible element connected to and controlling said two brakes, a rear braking mechanism, a brake actuating lever therefor, a brake controlling lever, a flexible connection controlled by said controlling lever, extending between said controlling and actuating lever, and between said actuating lever and said flexible element, adapted to operate both said actuating lever and said flexible element, means for adjusting the tension of said flexible connection, and means for adjusting the tension of said flexible element.

6. In a motor car, a front axle, two wheels rotatably mounted thereon, a brake for each wheel, a shiftable member carrying a pulley, a flexible element riding over said pulley, connected to and actuating said two brakes, a rear braking mechanism, a brake actuating lever therefor, a pulley carried by said actuating lever, a brake controlling lever, a flexible connection controlled by said controlling lever, extending between said controlling lever and said actuating lever pulley, and between said pulley and said shiftable member, whereby a pull exerted by said controlling lever upon said connection will be transmitted by both said actuating lever and said flexible element, and means for adjusting the tension of at least one of said flexible members.

7. In a motor car, a front axle, two wheels rotatably mounted thereon, a brake for each wheel, a shiftable member carrying a pulley, a flexible element riding over said pulley, connected to and actuating said two brakes, a rear braking mechanism, a brake actuating lever therefor, a pulley carried by said actuating lever, a brake controlling lever, a flexible connection controlled by said controlling lever, extending between said controlling lever and said actuating lever pulley, and between said pulley and said shiftable member, whereby a pull exerted by said controlling lever upon said connection will be transmitted by both said actuating lever and said flexible element, means for adjusting the tension of said flexible connection, and means for adjusting the tension of said flexible element.

8. In a motor car the combination, with a front axle, two wheels rotatably mounted thereon, and a brake for each wheel, of a flexible element connected to and controlling said two brakes, a propeller shaft, a braking mechanism therefor, and actuating lever for said braking mechanism, a brake controlling lever, and a flexible connection controlled by said controlling lever, extending between said controlling and actuating lever, and between said actuating lever and said flexible element, adapted to operate both said actuating lever and said flexible element.

9. In a motor car, a front axle, two wheels rotatably mounted thereon, a brake for each wheel, a shiftable member carying a pulley, a flexible element riding over said pulley, connected to and actuating said two brakes, a propeller shaft, a braking mechanism therefor, an actuating lever for said braking mechanism, a pulley carried by said actuating lever, a brake controlling lever, and a flexible connection controlled by said controlling lever, extending between said controlling lever and said actuating lever pulley, and between said pulley and said shiftable member, whereby a pull exerted by said controlling lever upon said connection will be transmitted to both said actuating lever and said flexible element.

10. In a motor car, a front axle, two wheels rotatably mounted thereon, a brake for each wheel, a shiftable member carrying a pulley, a flexible element riding over said pulley, connected to and actuating said two brakes, a propeller shaft, a braking mechanism therefor, an actuating lever for said braking mechanism, a pulley carried by said actuating lever, a brake controlling lever, a flexible connection controlled by said controlling lever, extending between said controlling lever and said actuating lever pulley, and between said pulley and said shiftable member, whereby a pull exerted by said controlling lever upon said connection will be transmitted to both said actuating lever and said flexible element, and means for adjusting the tension of at least one of said flexible members.

11. In a motor car the combination, with a front axle, two wheels rotatably mounted thereon, and a brake for each wheel, of a flexible element connected to and controlling said two brakes, a rear braking mechanism, a brake actuating lever therefor, a brake controlling lever, and a flexible connection controlled by said controlling lever, extending between said controlling and actuating lever, and between said actuating lever and said flexible element, adapted to operate both said actuating lever and said flexible element, said parts being so set that said actuating lever is operated in advance of said flexible element.

12. In a motor car, a front axle, two wheels rotatably mounted thereon, a brake for each wheel, a shiftable member carrying a pulley, a flexible element riding over said pulley, connected to and actuating said two brakes, a rear braking mechanism, a brake actuating lever therefor, a pulley carried by said actuating lever, a brake controlling lever, and a flexible connection controlled by said controlling lever, extending between said controlling lever and said actuating lever pulley, and between said pulley and said shiftable member, whereby a pull exerted by said controlling lever upon said connection will be transmited first to said actuating lever, and then to said flexible element.

13. In a motor car, a front axle, two wheels rotatably mounted thereon, a brake for each wheel, a shiftable member carrying a pulley, a flexible element riding over said pulley, connected to and actuating said two brakes, a propeller shaft, a braking mechanism therefor, an actuating lever for said braking mechanism, a pulley carried by said actuating lever, a brake controlling lever, and a flexible connection controlled by said controlling lever, extending between said controlling lever and said actuating lever pulley, and between said pulley and said shiftable member, whereby a pull exerted by said controlling lever upon said connection will be transmitted first to said actuating lever, and then to said flexible element.

14. In a motor car, a front axle, two wheels rotatably mounted thereon, a brake for each wheel, a shiftable member carrying a pulley, a flexible element riding over said pulley, connected to and actuating said two brakes, a propeller shaft, a braking mechanism therefor, an actuating lever for said braking mechanism, a pulley carried by said actuating lever, a brake controlling lever, a flexible connection controlled by said controlling lever, extending between said controlling lever and said actuating lever pulley, and between said pulley and said shiftable member, whereby a pull exerted by said controlling lever upon said connection will be transmitted first to said actuating lever, and then to said flexible element, and means for adjusting the tension of at least one of said flexible members.

OTTAVIO ZANCAN.